Patented Jan. 11, 1949

2,458,764

UNITED STATES PATENT OFFICE 2,458,764

METHOD FOR PREPARING SOLUTIONS OF COLLOIDAL SULFUR AND THE PRODUCTS THEREOF

Henri Brunel, Paris, France

No Drawing. Application December 26, 1945, Serial No. 637,285. In France May 3, 1945

5 Claims. (Cl. 252—313)

It has already been proposed to prepare colloidal solutions of sulphur by dissolving sulphur in a solvent and diluting said solution with water.

But sulphur solvents are generally but little soluble in water and on the other hand most of the solvents miscible with water dissolve only little sulphur so that the solution of colloidal sulphur obtained thereby by dilution in water have a very low concentration.

My invention has for its object a method for preparing solutions of colloidal sulphur of the type disclosed and the products thereof, said method consisting chiefly in the use as a solvent for sulphur, of an organic compound including one or more groups NH or $NH_2$ such as pyridine or ethylenediamine, the use of which later compound being of more particular advantage.

My present invention allows preparing a concentrated solution of sulphur which when added to water at the moment of use produces directly a fresh solution of colloidal sulphur.

With ethylenediamine, sulphur, produces viscous solutions of a brownish red color which allows transporting under a reduced volume important amounts of dissolved sulphur. These solutions are miscible with water and their addition to water produces as a matter of fact a greenish yellow aqueous solution of sulphur in ethylenediamine together with the solution of colloidal sulphur. The amount of water may vary as required according to the concentration which it is desired to obtain.

The solutions thus produced show sometimes the drawback of having a strong alkaline reaction. It is then sufficient to add thereto a predetermined amount of a diluted acid for obtaining its neutralization. During this neutralization, there is a total release under colloidal form of the dissolved sulphur and the solution assumes at once a milky white appearance; the product is preferably used under this form for agricultural and the like applications in particular through atomising.

In practice, the commercial product is constituted by a concentrated solution of sulphur in ethylenediamine. The user may dilute same according to the modus operandi corresponding to the desired application and he adds thereto for providing neutralization a measured amount of diluted acid, which amount depends on the amount of solution used.

The solutions obtained with pyridine may be used in the same manner. They show the drawback of having a lesser concentration of sulphur but the strong smell of pyridine bestows on it particular insectifugal properties.

It is possible of course to add to the solution obtained in accordance with my present invention, particular insecticidal products with a view to specific treatments.

I will now describe a particular form of execution of the method according to my invention:

I dissolve 1 kg. of sulphur flour in 10 kgs. of ethylene-diamine and I obtain a brownish red solution, I dissolve this solution in water in ratios varying between $1/10$ and $1/50$ and I neutralize such dilutions through a calculated amount of diluted hydrochloric acid for instance, which is added slowly under stirring conditions.

This provides a solution of colloidal sulphur suitable for various anti-eryptogamic treatments.

Solutions which are not neutralized may also be used whenever their alkaline character shows no drawback for the application considered.

What I claim is:

1. A method for preparing colloidal solutions of sulphur consisting in dissolving sulphur ethylenediamine, diluting the solution obtained in water and neutralizing exactly the dilution obtained with a diluted acid, for freeing the dissolved sulphur under the form of a colloid.

2. A concentrated solution of sulphur in ethylene-diamine.

3. A method for preparing colloidal solutions of sulphur consisting in dissolving sulphur in ethylenediamine, diluting the solution obtained in water and neutralizing the dilution obtained with a diluted acid, for freeing the dissolved sulphur under the form of a colloid.

4. A method for preparing colloidal solutions of sulphur consisting in dissolving sulphur in ethylenediamine, diluting the solution obtained in water and neutralizing the dilution obtained with a diluted acid, for freeing the dissolved sulphur under the form of a colloid, said acid being selected and added in such quantity to produce a predetermined pH of the solution.

5. A concentrated pseudo-solution of colloidal sulphur in ethylenediamine diluted with water and neutralized by an acid.

HENRI BRUNEL.

REFERENCES CITED

The following references are of record in the file of this patent:

UNITED STATES PATENTS

| Number | Name | Date |
|---|---|---|
| 1,429,522 | Mitasch et al. | Sept. 19, 1922 |
| 2,149,249 | Nitsche | Feb. 28, 1939 |
| 2,160,030 | Nitsche | May 30, 1939 |

OTHER REFERENCES

Seidel, "Solubilities of Inorganic and Metal Organic Compounds" (1940), vol. 1, page 1451.